[12] United States Patent
Nestorovic

(10) Patent No.: US 9,251,743 B2
(45) Date of Patent: Feb. 2, 2016

(54) OPTICAL SYSTEM FOR HEAD-UP AND NEAR-TO-EYE DISPLAYS

(71) Applicant: Seattle Photonics Associates, Bothell, WA (US)

(72) Inventor: Nenad Nestorovic, Bothell, WA (US)

(73) Assignee: Seattle Photonics Associates, Woodinville, WA (US)

( * ) Notice: Subject to any disclaimer, the term of this patent is extended or adjusted under 35 U.S.C. 154(b) by 21 days.

(21) Appl. No.: 14/213,307

(22) Filed: Mar. 14, 2014

(65) Prior Publication Data

US 2014/0267205 A1    Sep. 18, 2014

Related U.S. Application Data

(60) Provisional application No. 61/792,264, filed on Mar. 15, 2013.

(51) Int. Cl.
*G09G 3/34*     (2006.01)
*G02B 27/01*    (2006.01)

(52) U.S. Cl.
CPC .......... *G09G 3/3473* (2013.01); *G02B 27/0101* (2013.01); *G02B 2027/015* (2013.01); *G02B 2027/0125* (2013.01)

(58) Field of Classification Search
CPC .................................................... G09G 3/3473
USPC ....................................................... 345/208
See application file for complete search history.

(56) References Cited

U.S. PATENT DOCUMENTS

| 4,740,780 | A | 4/1988 | Brown et al. |
| 2009/0002526 | A1* | 1/2009 | Koishi ......................... 348/241 |
| 2010/0271698 | A1 | 10/2010 | Kessler |
| 2010/0302499 | A1 | 12/2010 | Watanabe |
| 2012/0224062 | A1 | 9/2012 | Lacoste et al. |
| 2012/0290401 | A1* | 11/2012 | Neven ........................ 705/14.68 |
| 2013/0088780 | A1* | 4/2013 | Jarvenpaa et al. ............ 359/566 |

FOREIGN PATENT DOCUMENTS

| KR | 1020020021091 A | 3/2002 |
| KR | 1020130012629 A | 2/2013 |

OTHER PUBLICATIONS

International Search Report and Written Opinion mailed Sep. 15, 2014, for International Application No. PCT/US2014/028799, International Filing Date Mar. 14, 2014, 11 pages.
Lanman, D. et al., "Near-eye light field displays", ACM SIGGRAPH 2013 Emerging Technologies, Article 11, 10 pages, ACM, Jul. 2013.
Steele, Billy, "NVIDIA Research's near-eye light field display prototype eyes-on (video)", Jul. 24, 2013 at 8:19 PM ET, Weblog in Engadget.com, [online] Retrieved from the Internet: <http://vvww.engadget.com/2013/07/24/nvidia-research-near-eye-light-field-display-prototype/>, pp. 1-11.

* cited by examiner

*Primary Examiner* — Sahlu Okebato
(74) *Attorney, Agent, or Firm* — Perkins Coie LLP

(57) ABSTRACT

Embodiments are disclosed herein that relate to compact optical systems for incorporation into head-up and near-to-eye display devices. One disclosed embodiment provides a head-up display system comprising a light source, a flat panel display including multiple copies of an image, and a lens array structure with a separate lens element for each copy of the image.

30 Claims, 5 Drawing Sheets

OPTICAL SYSTEM FOR HEAD-UP AND NEAR-TO-EYE DISPLAYS

This application claims the benefit of U.S. provisional patent application No. 61/792,264, filed on Mar. 15, 2013, which is incorporated herein by reference in its entirety.

FIELD OF THE INVENTION

At least one embodiment of the present invention pertains to display devices, and more particularly, to an optical system for head-up and near-to-eye displays.

BACKGROUND

Head-up display devices, such as those found in automotive and aircraft applications, may include various optical components arranged within the device, such as light sources, image producing elements, lens systems and/or other optical elements. Such optical components tend to occupy a significant amount of space, which may result in a head-up display having a large volume. As some head-up displays may be configured to fit into automobiles or aircraft cockpits, a large volume or high mass for such devices is often undesirable, as it may interfere with requirements for heating ducts, other instrumentation or safety features. Likewise, near-to-eye displays have similar requirements for low mass and volume for reasons related to user comfort.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here are examples of compact optical systems that are particularly useful for incorporation into head-up display devices and near-to-eye displays. Certain disclosed embodiments include a display panel that replicates an image (or portions thereof) many times. One disclosed embodiment provides a head-up display system that includes a light source, a flat panel display including multiple copies of an image, and a lens array structure with a separate lens element for each copy of the image. Each individual copy of the image is passed through a separate corresponding element of a lens array to form a composite virtual image. A single copy of the image paired with a single corresponding lens element forms a small exit pupil. By tiling an array of the paired image copies and lens elements, a much larger exit pupil (i.e., "aggregate exit pupil" or "eyebox") can be formed from many smaller exit pupils, while maintaining a relatively small form factor for the head-up display system. This large exit pupil facilitates comfortable viewing of the presented virtual image. Also, by utilizing a small subset of the overall display panel in conjunction with a lens element, a very low profile, compact and lightweight optical device can be achieved.

Figure 1:
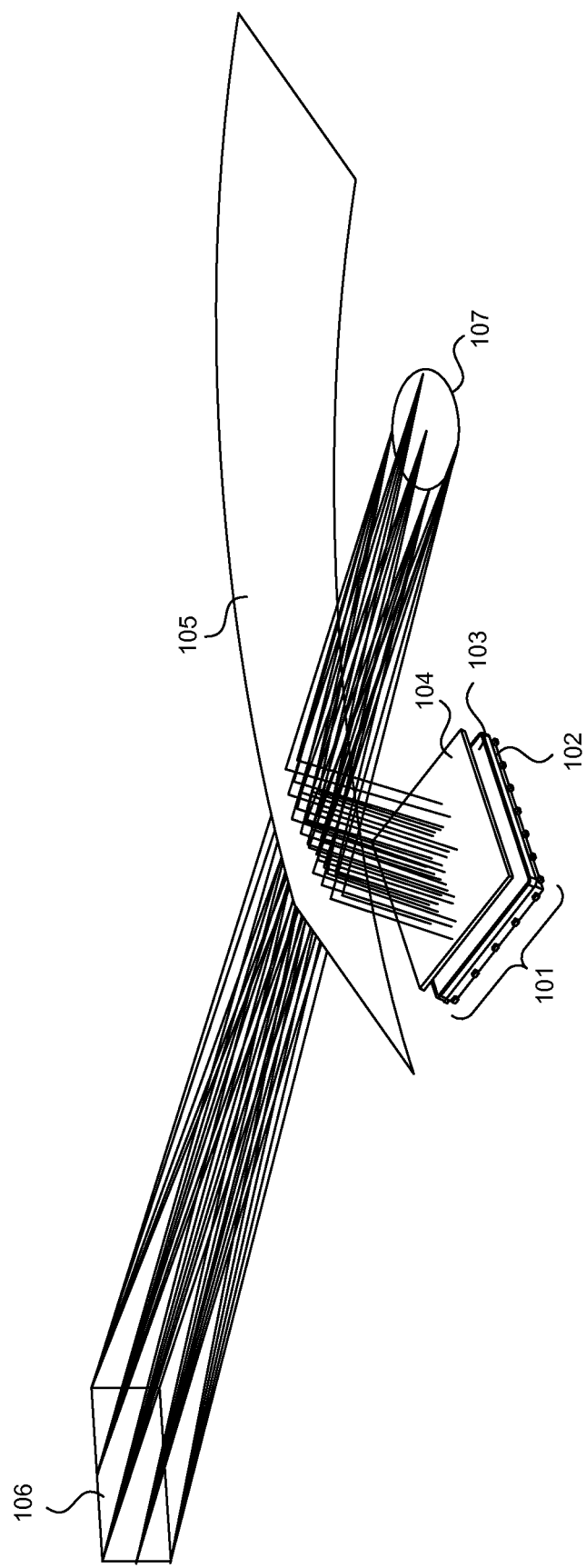
FIG. 1 shows an example of a head-up display system, such as it can be installed in an automobile or other vehicle.
Figure 2:
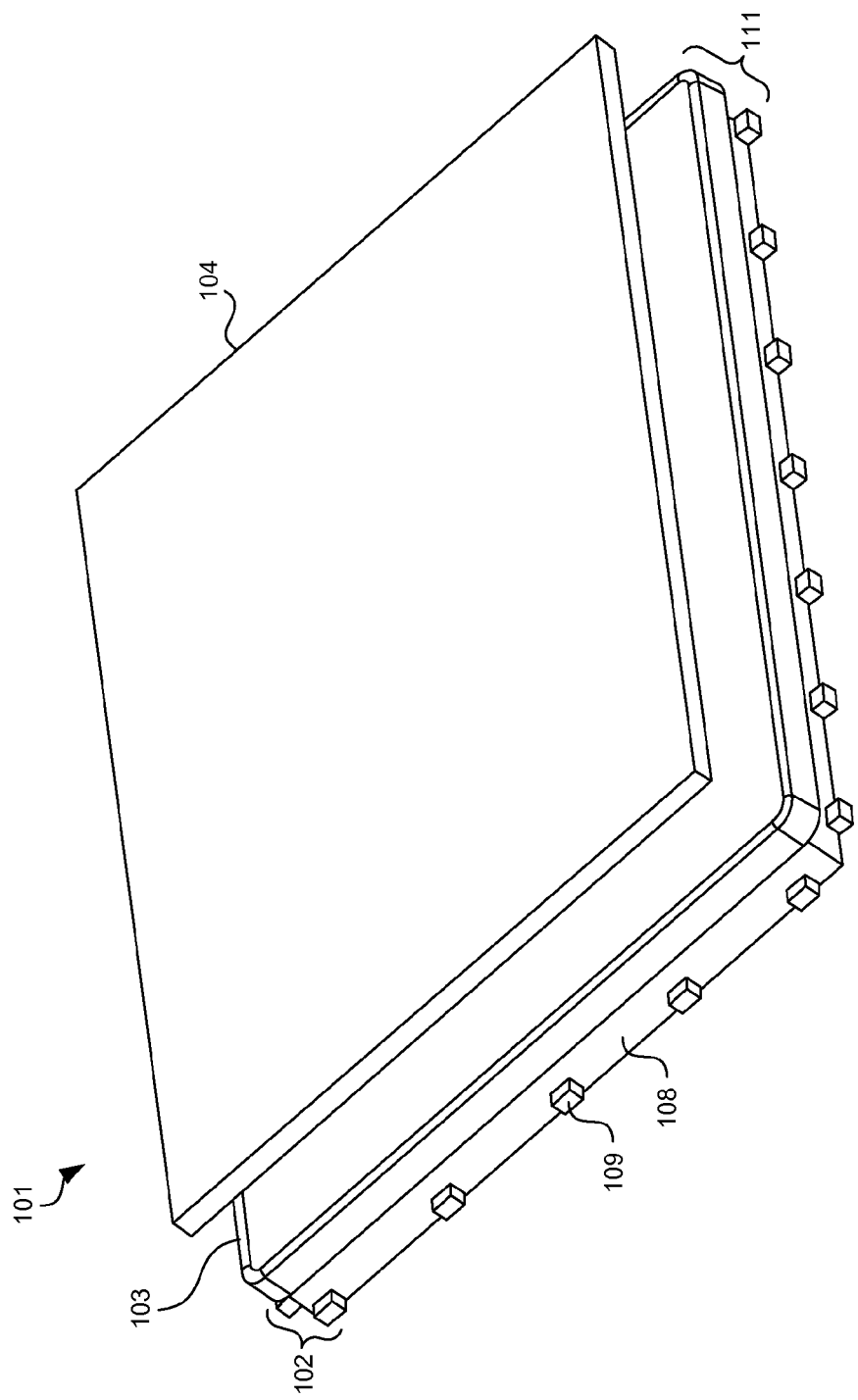
FIG. 2 shows an example of a close up view of a head-up display system according to one embodiment.
Figure 3:
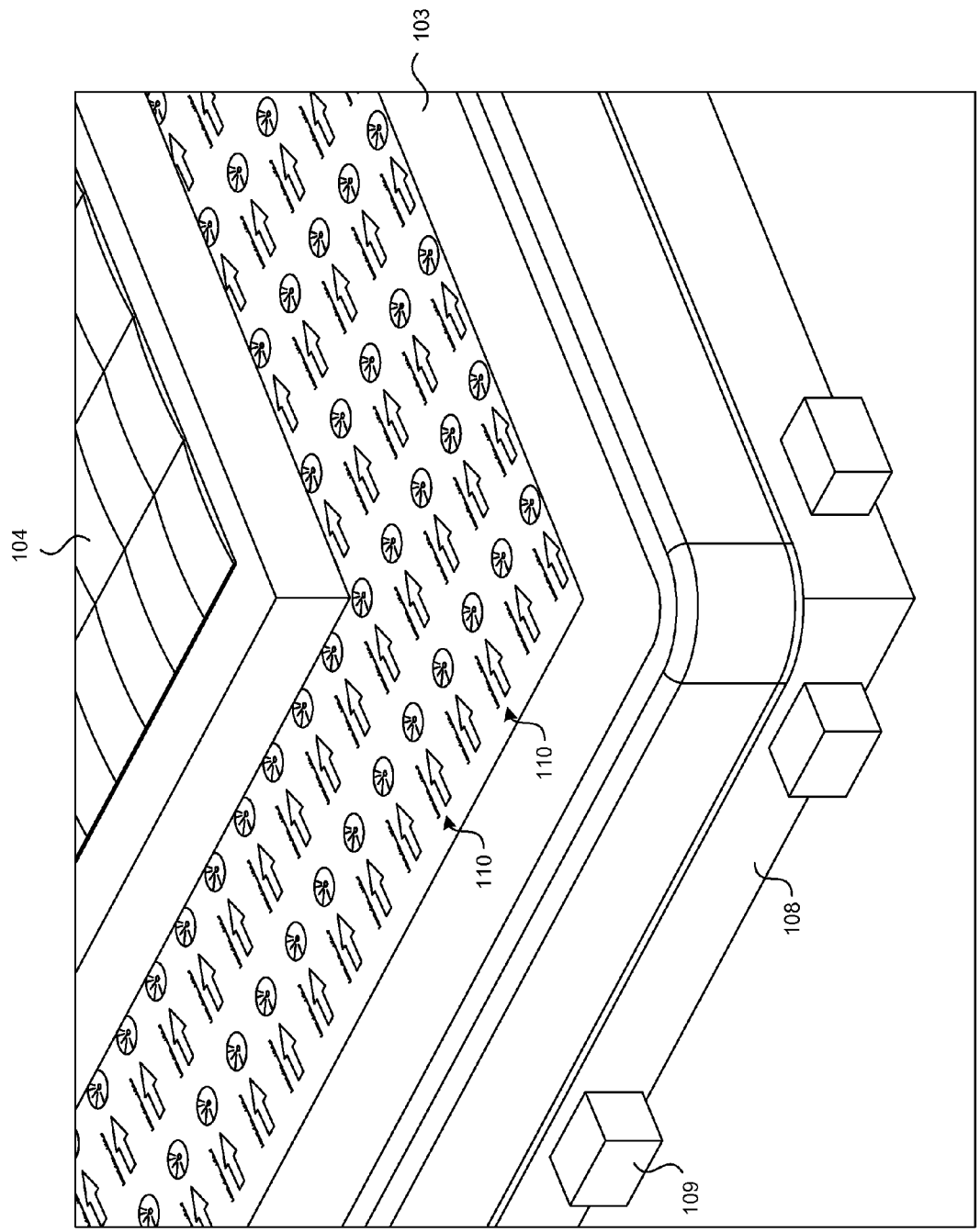
FIG. 3 shows in greater detail an example of the structure of a head-up display system according to one embodiment.

FIGS. 1, 2 and 3 show an example of a display engine that may be used to provide a head-up display device. The display engine 101 includes an image generator 111 and an optical medium 104. The optical medium 104 includes a plurality of light guides. In certain embodiments, the light guides are individual lens elements, and optical medium 104 is a lens array, as is henceforth assumed herein to facilitate description. In the illustrated embodiment, the image generator 111 includes an illumination module 102 and a transmissive flat panel display 103. Other embodiments can include a scanned display, or reflective display such as a Liquid Crystal on Silicon (LCoS) or Digital Light Processing (DLP) panel or other display technology in place of the transmissive flat panel display 103.

The illumination module 102 according to one embodiment includes a light guide 108 and a group of Light Emitting Diodes (LEDs) 109 placed in an arrangement such that the uniformity and angular content of light emitted from the illumination module 102 is well controlled. The display engine 101 can be placed in an arrangement with a vehicle windshield 105 or other optically reflecting component such that the virtual image 106 created by the head-up display system is presented in the nominal viewing direction of the user. The aggregate exit pupil (or "eyebox") 107 of the head-up display is the nominal location of the user's head and eyes.

FIG. 2 shows an example of a close up view of the display engine 101 according to the first embodiment. FIG. 3 shows in greater detail an example of the structure of the display engine 101 according to the first embodiment.

Figure 4:
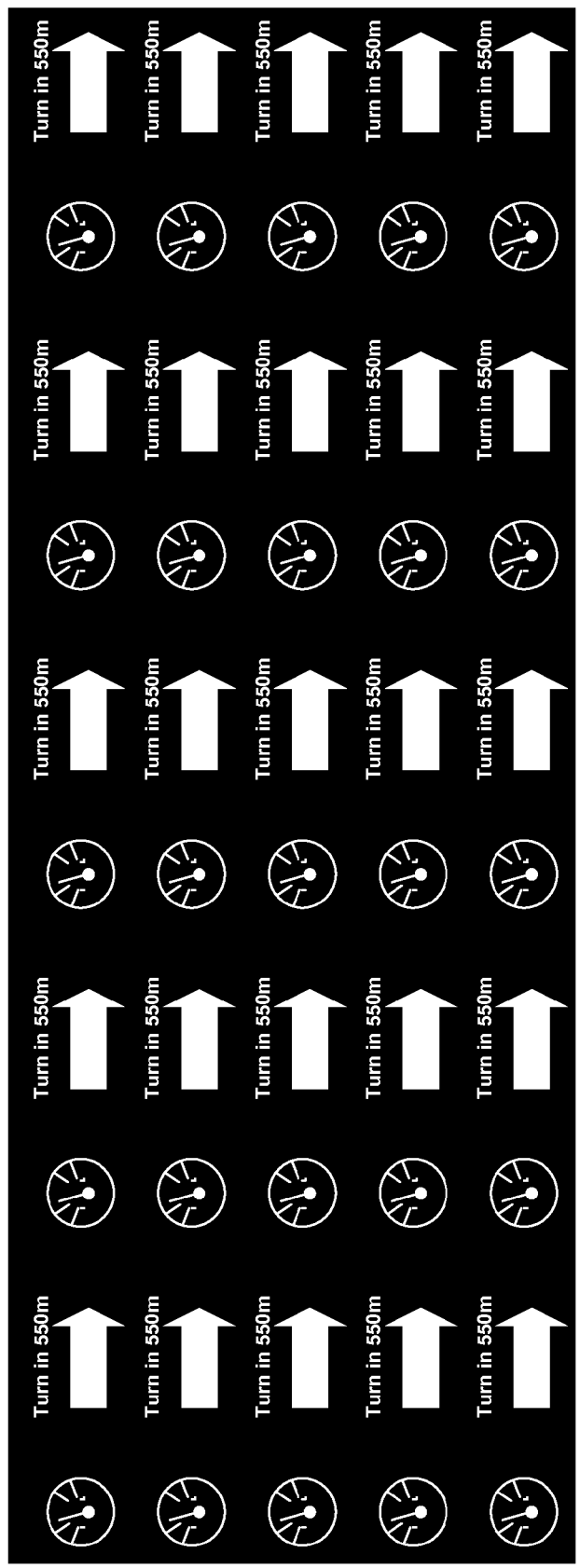
FIG. 4 shows an example of an array of images generated by a flat panel display according to one embodiment.
Figure 5:
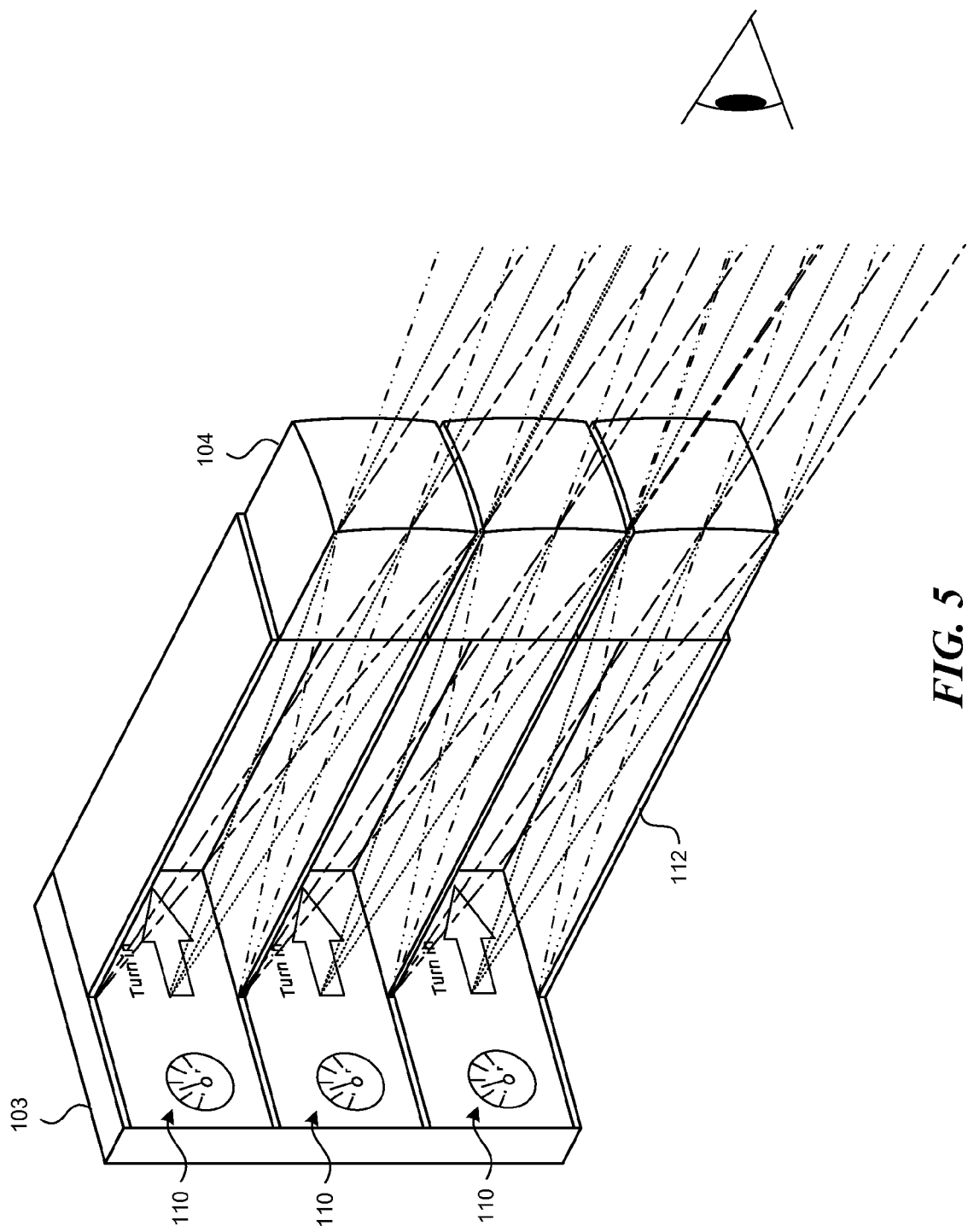
FIG. 5 schematically shows an example of a side view of a sample of array elements in a head-up display system according to one embodiment.

As shown in FIGS. 3, 4 and 5, in a first embodiment of the head-up display the flat panel display 103 creates multiple copies 110 of the desired virtual image in a tiled arrangement over a large portion of the active area of the flat panel display. FIG. 4 shows an example of an array of copies of an image, such as can be generated by the flat panel display 103. Note that in other embodiments, the individual images displayed by the flat panel display 103 can be non-identical variations of the final image (e.g., laterally shifted versions or different subsets of the final image, as discussed further below). Note that the generated images can be formed from either illumination on a dark background (as shown in FIG. 4) or the absence of illumination on an illuminated background. A lens or group of lenses is positioned axially above each individual copy of the image on the display panel. The term "axially" as used herein means perpendicular to the flat panel display 103, or in the viewing direction assuming there are no additional optics outside the display engine 101 (such as a windshield in an automobile) to alter the direction of light after emission from the display engine 101. Much like a camera lens can comprise multiple individual lenses, a group of lenses can be positioned axially above a single copy of the desired virtual image to improve image clarity and reduce optical aberrations. This single lens or group of lenses nominally occupies an area approximately equal to that of a single copy of the image on the display panel. These lenses can then be fabricated in the form of an array 104, such that the number of lens elements in the lens array 104 is equal to or at least a function of the number of copies 110 of the image on the display panel. In this description, any reference to a lens array "element" can represent a number of lens elements placed axially above a single copy of the image on the display panel. Other embodiments could use a microlens array, SELFOC array or diffractive optical element in place of the standard lens array 104. Likewise, the lens array 104 itself does not have to be perfectly uniform from lens element to lens element. Variations in lens element focal length or structure can be implemented in an array to accommodate variations in virtual image distortion due to windshield curvature, or to accommodate tolerances in the overall system architecture.

The field of view of the head-up display in this embodiment will be a function of the understood relationship between the focal length of a single lens element in the lens array and the dimensions of a single copy of the image on the display panel. In this description, any reference to a lens array "element" can represent multiple lens elements placed axially above a single copy of the image on the display panel, provided that the single copy of the image is optically coupled exclusively to those multiple lens elements.

For most embodiments of a head-up display engine, a single point in the virtual image is defined as a particular angle at the aggregate exit pupil 107. In the system introduced here, each lens element creates the same set of ray angles that form the virtual image. As long as the ray angles produced by a single lens element are consistent from lens element to lens element, the user will see a single continuous image over the size of the aggregate exit pupil, produced by rays from two or more of the lens elements in the array. The number of lens elements contributing to the image perceived by the user at a given moment in time depends on 1) the field of view of each lens element, and 2) the distance from the lens array to the aggregate exit pupil at that moment in time. It is important that all lens elements emit light at the same angles, so that when the user's head/eyes move around in the aggregate exit pupil (e.g., due to vehicle motion or the user adjusting his position), the virtual image remains static and appears to be coming from the same virtual point.

The aperture stop of each lens array element is the area of a single lens array element through which light from a single cell of the display panel can pass. In certain embodiments, the lens aperture is the last lens surface closest to the eye of the user, as that surface determines what rays emitted from the panel are allowed to pass out into the eyebox. In certain embodiments, the aperture stop of each lens is nearly equal to the size of a lens array element and is also nearly equal to the size of a single copy of the image on the display panel. The lens array elements and aperture stops are designed in such a way as to ensure that light from each individual copy of the image on a display panel passes through only those lens elements that are axially above that particular copy of the image. One possible method to ensure that light from an individual image copy passes through only a single lens is to create a small cavity between the display panel 103 and the lens array 104 that occupies a cross-sectional area equivalent to that of the single image copy, as shown in Fig. This cavity can also be part of an intermediate array structure of cavities that fits in between the display panel 103 and the lens array 104. A second method to ensure that light from an individual copy passes through only a single lens is to force the illumination module 102 to create illumination that has a very structured angular output. The angular output of this illumination module 102 should be matched to the desired angular input of the lens array elements 104. The lens array elements and aperture stops are also designed in such a way as to minimize the unused portions of the lens array elements and minimize the unused portions of the active area of the display panel. By minimizing the unused portions of the display panel and lens array elements, the uniformity of the aggregate exit pupil 107 ("eyebox") can be maximized.

FIG. 5 schematically shows a side view of a sampling of lens array elements 104 adjacent to a portion of the flat panel display 103. In FIG. 5, three copies 110 of the desired virtual image are shown on the left side of the figure from top to bottom. Broken lines in FIG. 5 represent examples of rays of light emitted from the image copies 110. Planar baffles 112 isolate the light rays from each individual image copy 110 from light rays emitted by any other image copy, during transit from the flat panel display 103 to their corresponding lens elements. The baffles 112 create a cavity between the flat panel display 103 and the lens elements 104. The baffles 112 may be made of highly light-absorptive plastic, for example, or can be textured or painted to reduce stray light contributions to the final image. The aperture stop area of a single lens element is typically smaller than the desired area of the aggregate exit pupil 107 or eye box of a head-up display device. In this first embodiment a tiled arrangement of lens elements 104 and similarly tiled copies 110 of the desired image can create a larger exit pupil or eye box for a head-up display device. The tiling arrangement can be, for example, a rectilinear, hexagonal or annular array. The larger exit pupil ("aggregate exit pupil") is generated, at least in part, by choosing the area of tiled lenses and image copies to exceed the desired area of the aggregate exit pupil of the head-up display device in proportion to a ratio of the distance of the viewer from the head-up display device to the field of view of the head-up display. The equation defining the required width of the display engine 101 can be defined as follows:

$$\text{Width} = \frac{D}{\tan(FoV/2)} + EB$$

where D is the distance between the display engine 101 and the aggregate exit pupil 107, FoV is the field of view of the display engine 101 and EB is the desired width of the aggregate exit pupil 107. This equation also applies to the vertical dimension of the aggregate exit pupil 107.

The aggregate exit pupil 107 of traditional head-up display devices is typically well defined at one particular location positioned some axial distance away from the head-up display engine. Having a well-defined location for the aggregate exit pupil 107 often results in vignetting or loss of some portion of the desired virtual image when the user moves towards or away from the nominal location of the aggregate exit pupil 107 location. The head-up display engine introduced here overcomes that problem by generating the full field of view of the desired virtual image anywhere inward of the nominal location of the aggregate exit pupil location.

Another embodiment of the head-up display engine 101 could include a macro-lens placed on top of the overall structure, to control angular resolution and the size of the aggregate exit pupil. Such a macro-lens could also be aspheric to correct windshield-induced distortion.

The short focal length of the individual lens elements within the lens array 104 results in a head-up display that has a low profile and that occupies far less overall volume than a traditional head-up display of equivalent performance. The low form factor requirements of this head-up display allow for the embedding of multiple similar head-up display devices into an automotive dashboard or other vehicular environment for large field of view systems.

A second embodiment of the head-up display device utilizes copies of the image that are shifted laterally by different amounts across the individual fields of view of their corresponding lens elements (i.e., along the display panel, perpendicular to the viewing axis) and strategically placed with respect to each individual lens element to increase the apparent field of view of the head-up display device. While the basic form of the head-up display engine remains the same, in this embodiment a lens array that has lens elements that are not consistent from element to element (as previously described) can be used to vary the local focal length from one lens element to another, and to compensate for distortion due to the windshield reflection. The copies of the desired virtual image would not be true copies in this embodiment. Each individual image would be a subset of the overall desired virtual image, shifted laterally in either axis (i.e., perpendicular to the display axis) in dependence upon its overall position in the array. In this way, not only would the aggregate exit pupil be a sum of many smaller exit pupils, but the field of view would be the sum of moderately smaller fields of view, overlapping in a desired manner.

A third embodiment of the head-up display device miniaturizes the flat panel display and lens array elements for use as a head-mounted or head-worn display. Fundamentally this embodiment can be substantially identical to the above-mentioned embodiments, however, the dimensions and distances are much smaller. Typically a pixel in a HUD application is on the order of 30 to 50 microns. In the case of a head mounted display the pixel sizes can be smaller by an order of magnitude. As a result, the focal lengths of the lens array elements should scale as a function of pixel size. A lower profile, lower mass head-mounted display can be realized with this embodiment. Another benefit to this embodiment would be energy savings through the use of dynamic control of the illumination module 102. A pupil tracking camera can determine the location of the user's pupil and communicate that location relative to the aggregate exit pupil to a processor or other form of control circuit in the display engine 101. The camera could be located within the HUD, for example via a beam-splitter mechanism, to stare back at the driver. Alternatively, the camera could be placed near the sun visor or on the dashboard of the vehicle to stare at the driver, and a corresponding coordinate transformation could determine the location of the driver's eyes relative to the exit pupil of the HUD. Individual smaller exit pupils (corresponding to image copies) can be turned off by the control circuit (for example, by turning off the corresponding image copies in the video signal, or by turning off the LED under a particular portion of the display panel) if it is determined that the smaller exit pupils do not fall on the user's pupil, thereby saving power. This embodiment can also benefit users with impaired vision due to cataracts or other ailments by turning off those small exit pupils that would nominally scatter or cause loss of contrast.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A display device comprising:
   an image generator configured to generate a plurality of images corresponding to a single user-perceivable image; and
   a plurality of light guides, each disposed to convey light associated with only a corresponding single one of the plurality of images to a corresponding exit pupil, the plurality of light guides collectively having a plurality of individual exit pupils that collectively form an aggregate exit pupil in which a user can perceive the single user-perceivable image.

2. A display device as recited in claim 1, wherein the aggregate exit pupil has a size larger than sizes of the individual exit pupils.

3. A display device as recited in claim 1, wherein each of the light guides has a field of view, and wherein the plurality of light guides combine to produce an aggregate field of view having a size equal to a sum of sizes of the individual fields of view of the light guides.

4. A display device as recited in claim 1, wherein each of the light guides has a field of view, and wherein the plurality of light guides combine to produce an aggregate field of view having a size greater than a sum of sizes of the individual fields of view of the light guides.

5. A display device as recited in claim 1, further comprising a plurality of cavities disposed between the image generator and the plurality of light guides, to convey light from the plurality of images each to only a separate corresponding one of the light guides.

6. A display device as recited in claim 1, wherein the plurality of images are identical copies of the single user-perceivable image.

7. A display device as recited in claim 1, wherein the plurality of images comprise different variations of the single user-perceivable image.

8. A display device as recited in claim 1, wherein the plurality of images are identically positioned within corresponding individual fields of view of corresponding ones of the light guides.

9. A display device as recited in claim 1, wherein the plurality of images are positioned differently from each other within corresponding individual fields of view of corresponding ones of the light guides.

10. A display device as recited in claim 1, wherein the plurality of images are disposed in a two-dimensional array of images.

11. A display device as recited in claim 1, further comprising control circuitry configured to selectively turn off particular ones of the individual exit pupils.

12. A display device as recited in claim 1, further comprising control circuitry configured to receive information indicating a location of a pupil of the user, and to selectively turn off ones of the individual exit pupils that do not coincide with the location of the pupil of the user.

13. A head-up display system comprising a display device as recited in claim 1.

14. A wearable near-to-eye display system comprising a display device as recited in claim 1.

15. A display device comprising:
   at least one light source;
   a flat panel display configured to use light from the at least one light source to generate a plurality of images corresponding to a final user-perceivable image; and
   a lens array optically coupled to the flat panel display and including a plurality of lens elements, each lens element disposed to convey a separate corresponding single one of the plurality of images to an exit pupil, the lens array thereby producing a plurality of individual exit pupils that collectively form an aggregate exit pupil in which the user can perceive the final user-perceivable image, the aggregate exit pupil having a size larger than sizes of the individual exit pupils.

16. A display device as recited in claim 15, further comprising a plurality of cavities disposed to convey light from the plurality of images each to only a separate corresponding one of the lens elements.

17. A display device as recited in claim 15, wherein the plurality of images are identical copies of the final user-perceivable image.

18. A display device as recited in claim 15, wherein the plurality of images are variations of the final user-perceivable image.

19. A display device as recited in claim 15, wherein the plurality of images are positioned identically within corresponding individual fields of view of corresponding ones of the lens elements.

20. A display device as recited in claim 15, wherein the plurality of images are positioned differently within corresponding individual fields of view of corresponding ones of the lens elements.

21. A display device as recited in claim 15, wherein each of the lens elements has a field of view, and wherein the plurality of lens elements combine to produce an aggregate field of view having a size equal to a sum of sizes of the individual fields of view of the lens elements.

22. A display device as recited in claim 15, wherein each of the lens elements has a field of view, and wherein the plurality of lens elements combine to produce an aggregate field of view having a size greater than a sum of sizes of the individual fields of view of the lens elements.

23. A display device as recited in claim 15, wherein the plurality of images are disposed in a two-dimensional array of images.

24. A display device as recited in claim 15, further comprising control circuitry configured to selectively turn off particular ones of the individual exit pupils.

25. A display device as recited in claim 15, further comprising control circuitry configured to receive information indicating a location of a pupil of the user, and to selectively turn off ones of the individual exit pupils that do not coincide with the location of the pupil of the user.

26. A method comprising:
generating a plurality of images corresponding to a single user-perceivable image; and
for each individual one of the plurality of images, conveying light associated with only said one of the plurality of images to a corresponding one of a plurality of exit pupils, such that the plurality of exit pupils collectively form an aggregate exit pupil in which a user can perceive the single user-perceivable image, wherein the aggregate exit pupil has a size larger than sizes of the individual exit pupils.

27. A method as recited in claim 26, wherein the plurality of images are identical copies of the single user-perceivable image.

28. A method as recited in claim 26, wherein the plurality of images comprise different variations of the single user-perceivable image.

29. A method as recited in claim 26, further comprising selectively turning off particular ones of the individual exit pupils.

30. A method as recited in claim 29, further comprising receiving information indicating a location of a pupil of the user, wherein said selectively turning off particular ones of the individual exit pupils comprises selectively turning off ones of the individual exit pupils that do not coincide with the location of the pupil of the user.

* * * * *